(12) United States Patent
Klimczak et al.

(10) Patent No.: US 6,513,111 B2
(45) Date of Patent: *Jan. 28, 2003

(54) METHOD OF CONTROLLING SOFTWARE APPLICATIONS SPECIFIC TO A GROUP OF USERS

(75) Inventors: Jarek Klimczak, Long Beach, CA (US); Vipin Chandra, Sunnyvale, CA (US)

(73) Assignee: Reuters, Ltd, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/246,351

(22) Filed: Feb. 8, 1999

(65) Prior Publication Data

US 2002/0023180 A1 Feb. 21, 2002

Related U.S. Application Data

(60) Provisional application No. 60/074,142, filed on Feb. 9, 1998.

(51) Int. Cl.⁷ .................................................. G06F 9/44
(52) U.S. Cl. ........................... 713/1; 713/166; 713/200; 709/317; 709/331; 345/741; 345/747
(58) Field of Search ................................ 345/333, 334, 345/335, 741, 747; 709/203, 313, 315–317, 331; 713/1, 166, 200

(56) References Cited

U.S. PATENT DOCUMENTS

| | | | | |
|---|---|---|---|---|
| 5,115,501 A | * | 5/1992 | Kerr | 345/707 |
| 5,263,165 A | * | 11/1993 | Janis | 711/163 |
| 5,432,934 A | | 7/1995 | Levin et al. | 395/650 |
| 5,488,686 A | * | 1/1996 | Murphy et al. | 345/330 |
| 5,677,952 A | | 10/1997 | Blakley, III et al. | 380/4 |
| 5,720,007 A | * | 2/1998 | Hekmatpour | 706/11 |
| 5,774,879 A | * | 6/1998 | Custy et al. | 358/1.11 |
| 5,838,970 A | * | 11/1998 | Thomas | 709/303 |
| 5,897,635 A | * | 4/1999 | Torres et al. | 707/10 |
| 6,014,137 A | * | 1/2000 | Burns | 345/334 |
| 6,144,959 A | * | 11/2000 | Anderson et al. | 707/9 |

FOREIGN PATENT DOCUMENTS

WO          94-08309          4/1994          G06F/15/20

OTHER PUBLICATIONS

B.E. Cripe, "A Common Desktop Environment for Platforms Based on the UNIX® Operating System," Hewlett–Packard Journal, XP000591784, vol. 47, No. 2, pp. 6–14 (1996).

* cited by examiner

Primary Examiner—Jeffrey Gaffin
Assistant Examiner—Ilwoo Park
(74) Attorney, Agent, or Firm—Banner & Witcoff, Ltd.

(57) ABSTRACT

Computer software application which defines "action items" in order to allow subscriber control of user access to various functionality or features of the application on a user-by-user basis. "Action items" may correspond to many various types of functionality relating to the user interface, such as data display, data output and data transfer, rather than to database access or database modification privileges. In this way a subscriber can give its users access to more or fewer user interface features, depending upon individual user needs and abilities, on an individualized basis.

34 Claims, 6 Drawing Sheets

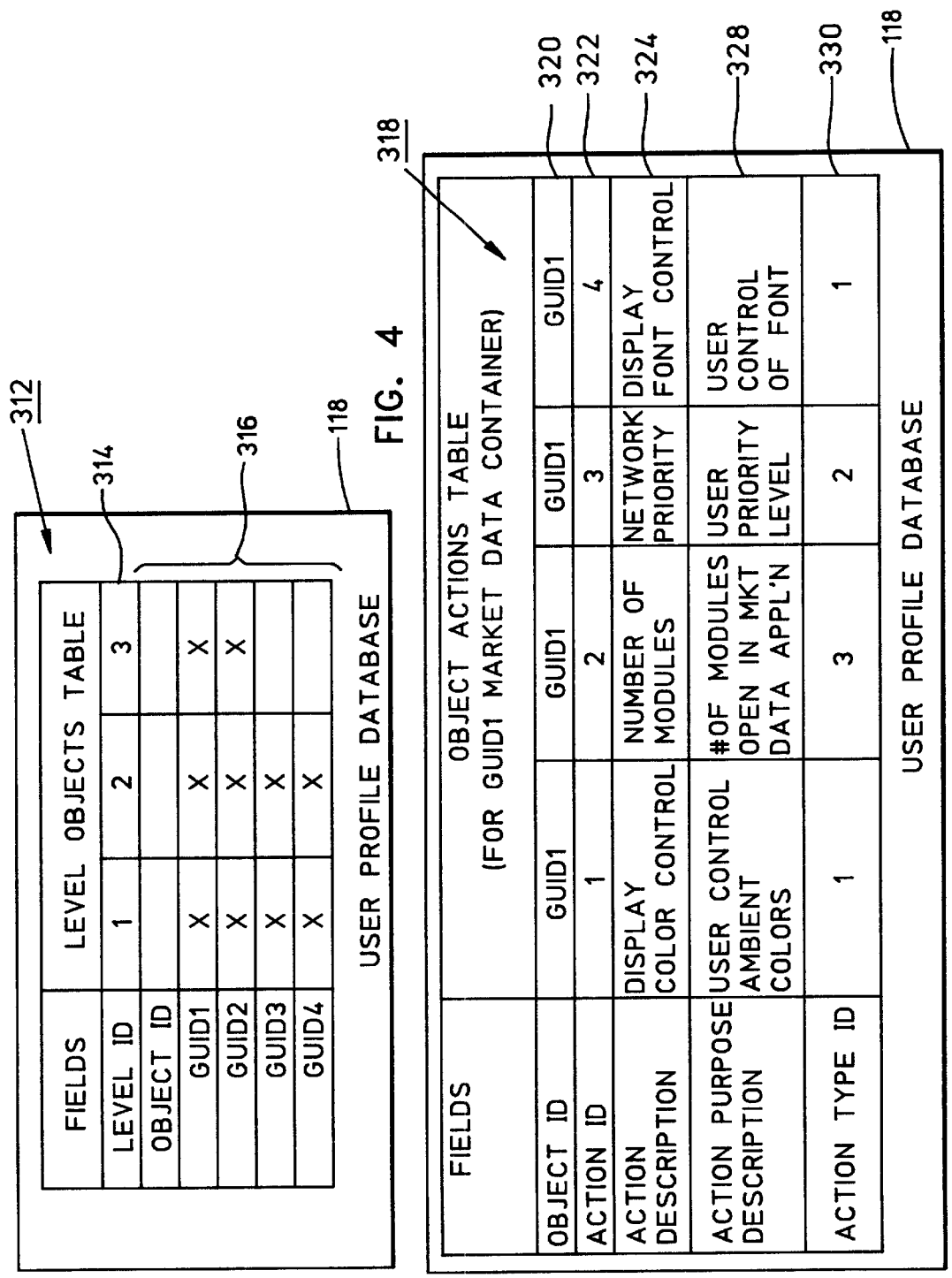

METHOD OF CONTROLLING SOFTWARE APPLICATIONS SPECIFIC TO A GROUP OF USERS

RELATED APPLICATIONS

This application claims the benefit of U.S. Provisional Application No. 60/074,142 (filed Feb. 9, 1998).

BACKGROUND

1. Field of the Invention

This invention relates generally to computer software applications providing for customized access to software applications, and more particularly to subscriber control of the customization on a user-by-user basis. Note that a subscriber is an institutional software customer, such as a company, and a user is an individual (person or piece of hardware) which uses the application supplied by the subscriber. For example, application users might be company employees who use an application in the course of their employment with the subscriber.

2. Description of the Related Art

In some conventional software applications, such as word processing programs, web browsers and market data applications (for receiving current financial information), users can customize aspects of the user interface. For example, a user may be able to customize application display colors, or print format, or data transfer rate of data transfers, or the content of pull down menus and so on.

One advantage of this kind of application is that a sophisticated and disciplined users can optimize their interfaces according to their individualized wants and needs. On the other hand, a disadvantage of these conventional applications is that an unsophisticated or undisciplined user might customize her user interface in a counter-productive way. This is not good for the user or for her associated subscriber.

SUMMARY OF THE INVENTION

It is an object of at least some embodiments of the present invention to provide for subscriber control of the user interface for users associated with the subscriber. It is a feature of at least some embodiments of the present invention that a software application defines action items relating to aspects of each user's access, which action items are configured by the subscriber on a user-by-user basis. It is an advantage of at least some embodiments of the present invention that users are allowed access to aspects of the user interface on an individualized basis according to subscriber's configuration decisions.

According to the present invention, a method of using a software application generally includes the steps of providing an application having "action items" to a subscriber, and having the subscriber configure the "action items" with "action item values" on a user-by-user basis (or on the basis of groupings of users).

As the term is used herein, an "action item" is any aspect of the functionality of the software application, except that "action items" do not include access to data or databases, access to portions of data or databases, ability to modify data or databases, or ability to control action item configuration or data or database modification permission. To illustrate, providing for control of application display colors is an example of an "action item," while access to some specific database which can be provided by the application cannot be considered as an "action item." Other examples of "action items" will be given throughout this application to help convey the concept of "action items," but these examples are not intended to limit the definition of "action items" provided in this paragraph.

A physical medium can be coded with a computer software application according to the present invention. Some exemplary physical mediums are floppy disks, hard magnetic disks, optical disks, magnetic tapes, read only memories, random access memories and so on. The coded software application includes application code and configuration code. The application code corresponds to computer instructions for executing the software application, with the application code defining at least one action item. The configuration code corresponds to computer instructions for configuring the computer software application with action item values the users, whereby each user's access with respect to the action item is determined by the action item value. This way, a subscriber can configure the application for each user by defining the action item values.

It is noted that while the present invention relates to subscriber (institutional software customer) control, and more particularly to subscriber (institutional software customer) control effected by configuring software, this configuration will generally be carried out by an individual or individuals who have been delegated to decide on the subscriber's configuration strategy and to actually input the desired configuration information into the appropriate computer(s). Therefore, as used herein, the term "subscriber" includes these delegated individuals. In some embodiments of the present invention, the delegated individuals may include third party individuals, user individuals, or individuals affiliated with the software manufacturer.

BRIEF DESCRIPTION OF THE DRAWING

The objects, advantages and features of the present invention will become more readily apparent from the following detailed description, taken together with the accompanying drawing, in which:

FIG. 4 is a level-objects table used by the software of FIG. 1;

FIG. 5 is an object actions table used by the software of FIG. 1;

DETAILED DESCRIPTION OF THE PREFERRED EMBODIMENTS

The present invention relates generally to any kind of software which can be purchased by a first party subscriber (for example, person, company or other entity) and then used by a plurality of second party users (for example, employees of a company). According to the present invention, the subscriber can set the software up differently for each of the users on an individualized basis (or on the basis of groupings of users). More particularly, the first party can set action item values to individually control action items for each of the users. The action items may relate to many different parameters of the software operation, such as extent of user control of the application display, extent of user control of the data output, or extent of user control of data transfer.

Below, the present invention will be explained in terms of an exemplary embodiment of a market data software package for providing current and historical financial information to brokers. In this example, the subscriber will generally be a brokerage house which can customize the market data software for each of its broker-users. Each broker-user will have a set of action item values to control action items. These action items will determine various aspects of how the software will be executed for each broker-user. In this way, the subscriber can set up the software so that each broker-user can use the software in an optimal fashion according to the abilities and needs of each individual broker-user.

Figure 1:
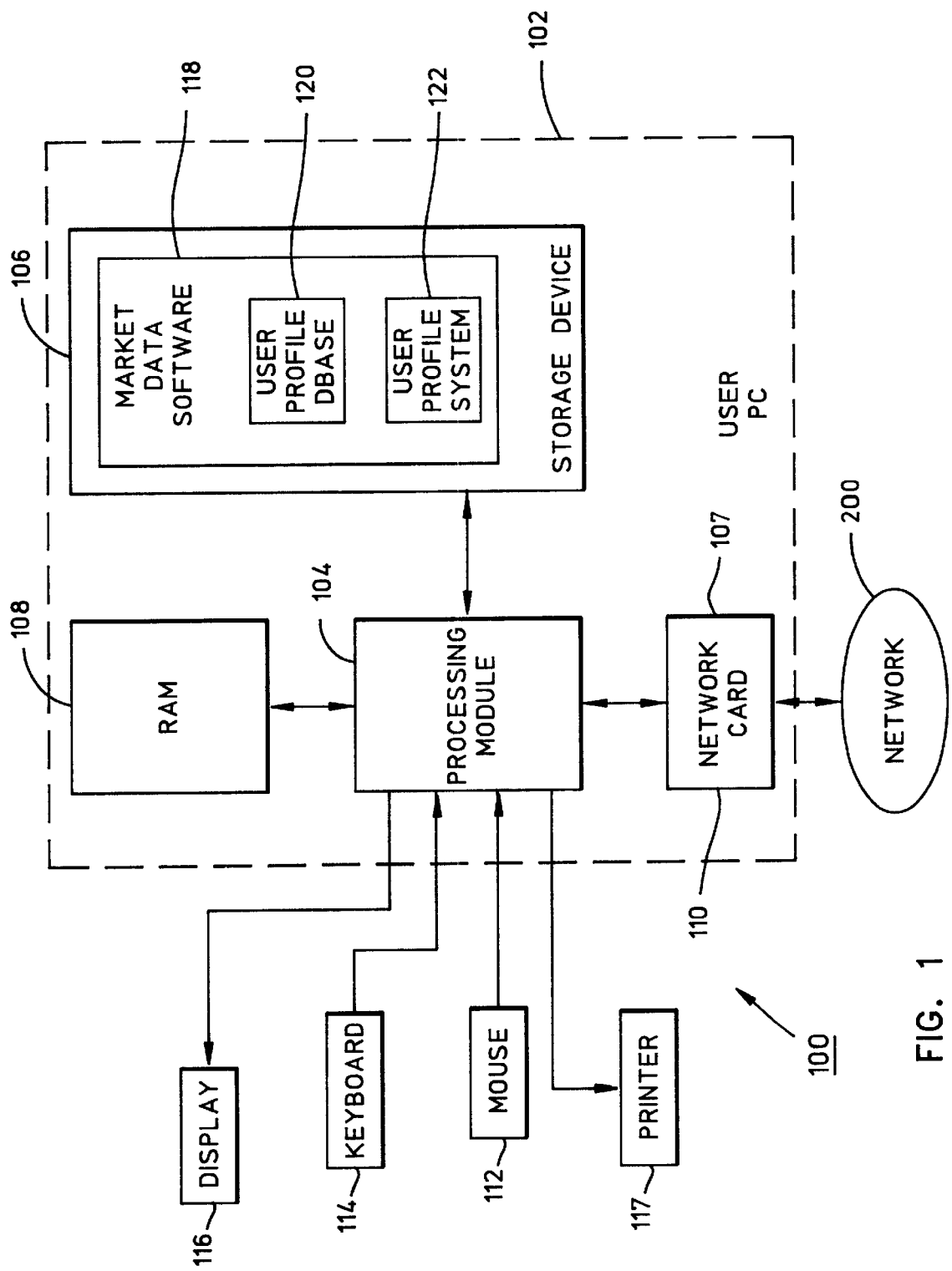
FIG. 1 is a block diagram of an embodiment of a computer system which stores and executes an embodiment of software according to the present invention.

FIG. 1 shows an embodiment of a computer system 100 which can be used to run the exemplary market data software according to the present invention. For the sake of simplicity, exemplary computer system 100 is a stand-alone personal computer (PC) system. However, in some preferred embodiments, the market data software may be operated on a computer system having one or more server computers and one or more user workstations. This kind of server/workstation architecture is typical in many brokerage houses. The server computers store data or programs which is be accessed by users (such as brokers) through individual workstations, such as PC's.

Computer system 100 includes user PC 102, mouse 112, keyboard 114, display 116 and printer 117. Mouse 112 is a conventional mouse input device which is connected to provide user input to user PC 102. Keyboard 114 is a conventional keyboard input device which is connected to provide user input to user PC 102. Display 116 is a conventional monitor which provides a screen display, such as a cathode ray tube display or liquid crystal display, which includes an application display generated by market data software 118 and output by user PC 102. Printer 117 is a conventional printer which provides a hard copy, such as a printed page of data output from user PC 102.

User PC 102 includes processing module 104, storage device 106, network card 107 (with networking software) and random access memory (RAM) 108. Processing module 104 provides the data processing functions of the user PC 102. Processing module 104 would include a conventional central processing unit and other conventional data processing circuitry. Storage device 106 provides permanent data storage. Storage device 106 may be, for example, a hard magnetic disk. RAM 108 provides temporary storage of data. RAM 108 may be a conventional RAM memory.

Network card 107 can communicate with network 200. Priority given to communications to and from network card 107 are controlled according to a variable priority level. For example if the priority value of network card 107 is set to 1 (low), then the communications may be handled as relatively low priority communications. Priority values 2 and 3 correspond respectively to medium and high priority level communications. Network 200 may be a public network of computers, such as the Internet, a private network of computers, such as an office intranet, or it may be a combination of these two kinds of networks.

As shown in FIG. 1, computer files making up the market data software package 118 are stored in storage device 106. Alternatively, these files could be stored wholly or in part on a removable storage device, such as a CD-ROM, or on a separate server computer. When market data software 118 is operated by a user, data related to program execution is also stored in RAM 108. Below, a portion of market data software 118 called user profile database 120 will be discussed in some detail.

User profile database 120 is created and maintained by the user profile system 122, which is a security sub system in market data software 118. In this example, user profile database 118 contains data for all users who might potentially use the user PC 102. In embodiments where there is a server computer, the server computer may store and maintain a user profile database for every possible user.

One exemplary user profile system is structured as an extension to an existing policy system that was used with Quotron (now called Reuters Plus) market data software package release version 5.01.07 and earlier versions. The user profile system 122 is used to configure user profile database 120 to control user access parameters by the subscriber on a per user basis. In this example, each user is assigned a security level (expert, medium or novice) which corresponds to three different ways that action items are configured. The security level represents the extent of access privileges for groups of users as controlled by the action item configuration.

Alternatively, all action item values could be uniquely configured for each and every user. While this alternative scheme allows greater flexibility, grouping users into a few different security levels makes it much less time consuming for the subscriber to configure user profile system 122 when there are a great multitude of users. This is because each user merely needs to be assigned a single security level for predetermined access, rather than being configured for custom settings with respect to every action item.

The market data software 118 includes many "objects." "Objects" is herein used as a generic word to refer any module (Executables, Agents or AAE Service OCXs) that is participating in the market data software 118. Each object is identified with a unique ID called the Object ID. Action items (defined above) are properties or attributes of an object that can be configured using user profile system 122. Action items are the items of the object which are imposed with some sort of access control using user profile system 122.

Implementation of market data software 118 proceeds in three stages. First, at the design stage, action items are identified and classified and user profile system 122 is written accordingly. Second, at the subscriber configuration stage, action item values are set by the subscriber for each of the users so that the market data software 118 will operate in a customized way for each security level. Third, at the run time stage, the user operates market data software 118, with the action item parameters being controlled according to the subscriber-set action item values for that particular user. Each of these stages is discussed in more detail below.

1. Design Stage

Generally, the market data software will not be designed on user PC 102, but rather will be designed by a software designer on some other machine, from where the software is copied to storage device 106. The design time stage involves creation of user profile database 120. Design activity involves each of the modules (objects) in the market data software 118, as each module has to generate the parameters which are to be subscriber-controlled "action items" that will be participating in the user profile system.

Generation of the action items information for a module will now be described. Action information is stored in the serialized files with extension ".PRO." Each module has to provide the following pieces of information in order to generate the .PRO file:

Object ID: This is an identification code (GUID) associated with the module,

Object Description: Name of the object, and

Array of Action Items: This contains following information:

Action ID: Unique integer value to identify an action item for this object,

Action Desc: Description of the action item. This could be name of the menu item or a particular attribute of the object, and Action Item Type: This filed tells the type of the action item.

Action item types are an important aspect of some embodiments of the present invention, because the use of different action items types allow different kinds of user access parameters to be efficiently handled through a single user profile system 122. Each defined action item will be classified under one of the predetermined action item types. In this exemplary embodiment, three types of actions are identified:

(1) Dual State Action Type: This action type is used to represent any action item that has two states—TRUE/ENABLE and FALSE/DISABLE.

(2) Limit Action Type: This is used to represents those properties (actions) of the object that can be best described with an upper or lower limit.

(3) Range Action Type: This is used to represent those properties (actions) of the object that can best be described by having a lower and an upper limit.

Apart from these types of actions more generic action types can be defined.

One example of an action item is the "menu" action item, which is a Dual State Action Type. Another example is "object count" action item, which is a Limit Action Type.

Another piece of information used in creating the .PRO file is the Action Purpose Description. The Action Purpose Description gives the detailed description about the action item, which is displayed in the profile editor when the subscriber selects the action item for configuration. The Action Purpose Description should give a clear description of the action item and its purpose.

Another piece of information used in creating the .PRO file is the Default Value. The Default Values are stored under the default security level. When an object requests the profile information for an action item, but the action item is missing, then these default values are returned as the values for the action item. Values should be set with an Action Default Value and an Action Default Extra Value.

With respect to the Action Default Value, if an action item is a menu item or a Dual State Action Type item, then set it as either TRUE or FALSE. If the action item is a Range Action Type item, then it is set as the default minimum range. For Limit Action Type items, the Action Default Value is ignored.

With respect to the Action Default Extra Value, for Dual State Action Type items, the value set to this file is ignored.

For Limit Action Types items, the Action Default Extra Value sets the default limit for the action item. For Range Action Type action items, this filed should be set to a value which will be treated as the default maximum value. Preferably, the maximum default value (Action Default Extra Value for Range item) is set to be less than the minimum default value (Action Default Value for Range item).

The foregoing pieces of information are maintained internally by each module and used to generate the serialized action information file with a .PRO extension. One example of a possible action item defined by various modules is user control of the application display colors. This may defined as a Dual State Action Type which can be configured to ENABLE (user permitted to control display colors) or DISABLE (user not permitted to control display colors).

2. Subscriber Configuration Stage

After the subscriber installs the market data software 118 on user PC 102, the subscriber uses a tool called Profile Editor to configure and update the user profile database 120, so that each broker-user will be able to optimally operate the market data software on an individualized basis.

The Profile Editor provides a graphical user interface to set action item values for each user for each of the action items. Using this tool, different security levels can be created. Interface is provided to import the action information generated by each of the modules. Using this imported action information, user profile database 120 is updated for the object of interest. The detailed control flow for user profile database 120 updates will be explained below.

Returning to the exemplary action item relating to user control of application display colors, the subscriber sets an action item value for this action item as ENABLE or DISABLE for each user, depending upon whether the subscriber perceives that the particular user is talented and disciplined enough to utilize control of application display colors in a constructive manner.

It is noted that user control of application display colors (as well as other action items) may be restricted for somewhat subtle reasons. For example, some financial information may be necessarily displayed in a predetermined color which cannot be changed. In this case, if a user set the ambient background color of the application display to be the same as the predetermined color, then the information in the predetermined color would not be visible in the application display. Clearly, this would be a problem because the user would miss information, and might not even be aware that the hidden information was not being visibly displayed.

3. Run Time Stage

At this stage, a user operates the market data software 118, which will be controlled in accordance with the action item values set by the subscriber for the security level of the particular user. When a module is started, user profile information is requested from the user profile database 120. User profile database 120 is consulted for the requested module under the security level assigned to the user.

Preferably, the user who is using the market data software 118 will be identified by entering a user identification code and a password. However, there are other ways to make sure that the correct user profile information is consulted for the user. For example, each user may have a dedicated workstation so that the workstation will have only user profile information for some predetermined user, This may make it unnecessary to use user identification codes or the like. As another alternative, user identity could be determined by conventional electronic fingerprinting, photographing, voice recognition or the like.

Now that the three stages of action item implementation have been described, various tables used to information related to action items and action item values will be described in more detail. For the sake of simplicity, the tables of this example will be have information for only a few users, objects, action items, and so on. Actual tables may be much larger to accommodate all of the necessary action item related information. User profile database 120 is used to maintain the action items values for the users. User profile database 120 is created using Microsoft Access 97. The tables discussed directly below are defined to maintain the user profile information.

Figure 2:
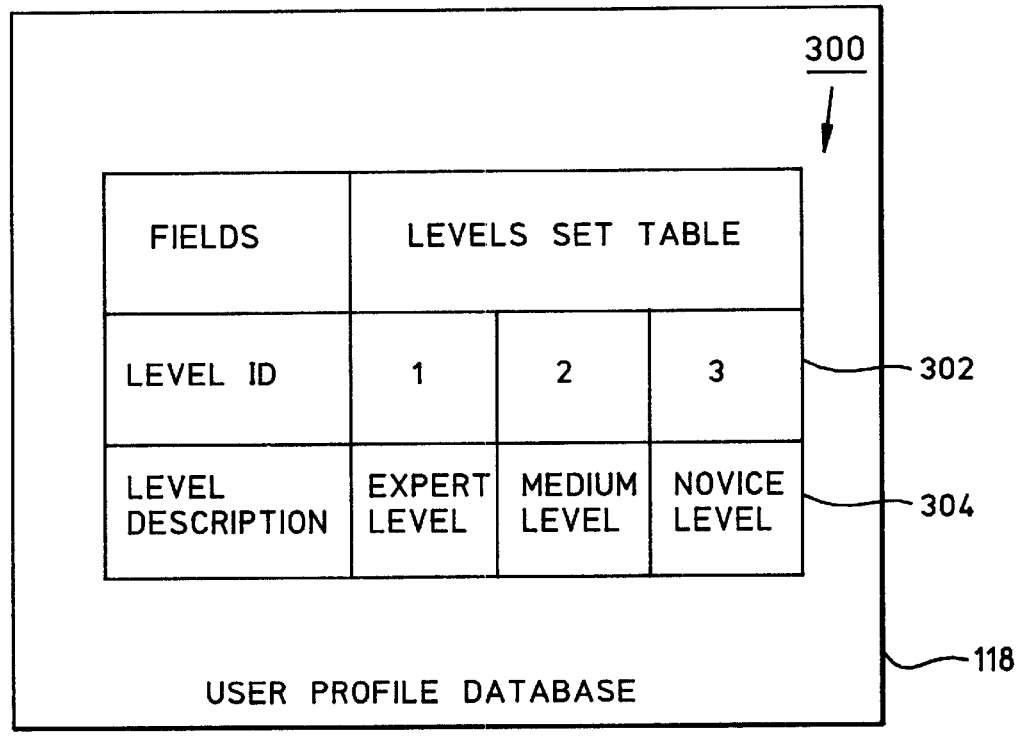
FIG. 2 is a levels set table used by the software of FIG. 1.

Levels set table 300 is shown in FIG. 2. Levels set table 300 is used to maintain all currently available security levels. It has two fields, Level ID field 302 and Level Description field 304. Level ID 302 is an integer value which uniquely identifies the security level. Level Description is a user friendly name assigned to the security level. Initially, when an empty database is created, an entry called "Default Level" is added to the database.

Figure 3:
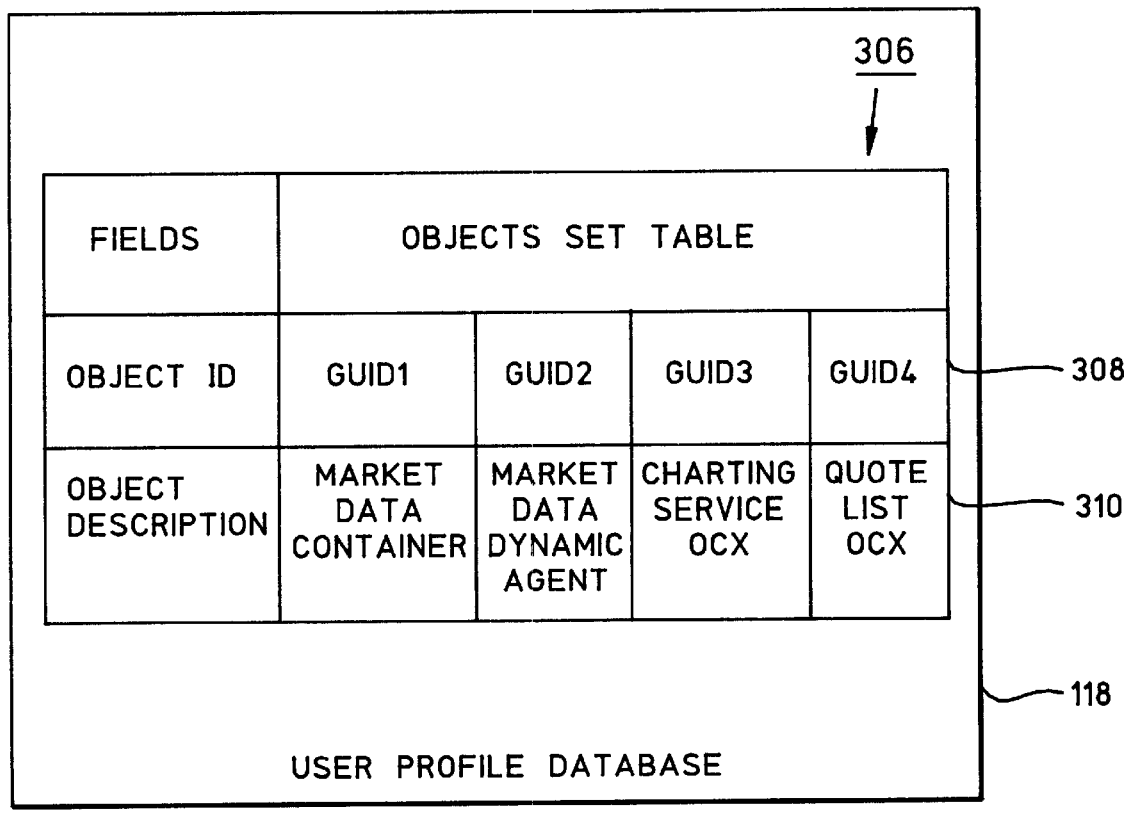
FIG. 3 is an objects set table used by the software of FIG. 1.

As shown in FIG. 3, objects set table 306 is used to maintain a list of the objects that are participating in user profile system 122. In other words, this table keeps track of all objects which have associated action item parameters. Objects set table 306 has two fields, Object ID field 308 and Object Description field 310. Object ID 308 is a Globally Unique Identifier (GUID) used to represent each object. Object description 310 is a user friendly name assigned to each object. When a database is created, a default entry is added to this table with the description "Default Object."

As shown in FIG. 4, level-objects table 312 is used to maintain lists of objects under each security level. Level-objects table 312 has two fields, Level ID field 314 and Object ID field 316. Object ID 316 is of the GUID for each object. Level ID 314 is an associated integer value uniquely identifying the security level for each object. There can be more than one object under each security level. When a database is created an entry is created in this table for the "Default Object" under the "Default Level."

As shown in FIG. 5, object actions table 318 is used to maintain list of available action items under each object that participates in the user profile system 122. This table has five fields: (1) Object ID 320, (2) Action ID 322, (3) Action Description 324, (4) Action Purpose Description 328 and (5) Action Type ID 330. Object Id 320 is the GUID used to represent each object. Action Id 322 is an integer uniquely identifying each action item. Action Description 324 is a description of each action item and is object specific. Action Purpose Description 328 is a clear description of the purpose served by each action item. Action Type Id 330 indicates the action type of action item and is indexed to an entry in the Actions Type Table discussed below.

Figure 6:
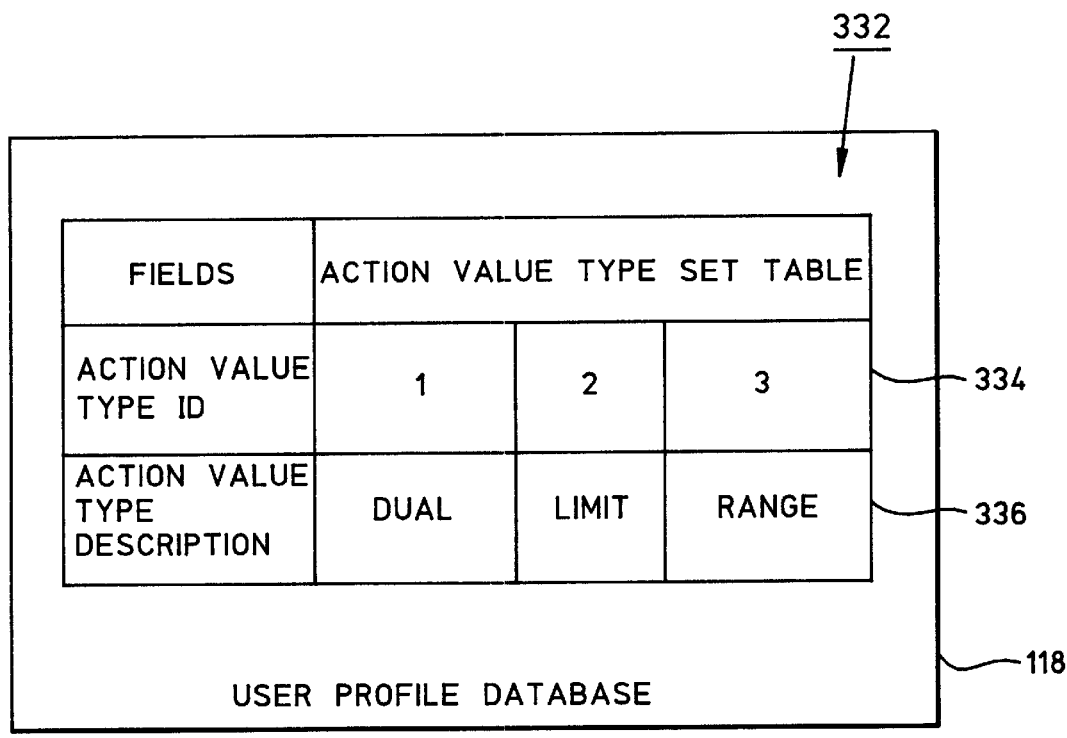
FIG. 6 is an action value type set table used by the software of FIG. 1.

As shown in FIG. 6, actions value typeset table 332 is a fixed table with three entries. As explained above, in this example, three types of actions are supported based on the values they take. They are:

(1) Dual State Actions—this type supports Boolean values, such as ENABLE or DISABLE,
(2) Limits Type Actions—this type supports an upper limit value, and
(3) Range Action Type—this type supports lower and upper limit values.

The actions value type table has two fields, Action Value Type ID field 334 and Action Value Type Description 336. Action Value Type Id 334 identifies the action value type. Action Value Type Description 336 describes the value type, such as "Dual State," "Limit," or "Range".

Figure 7:
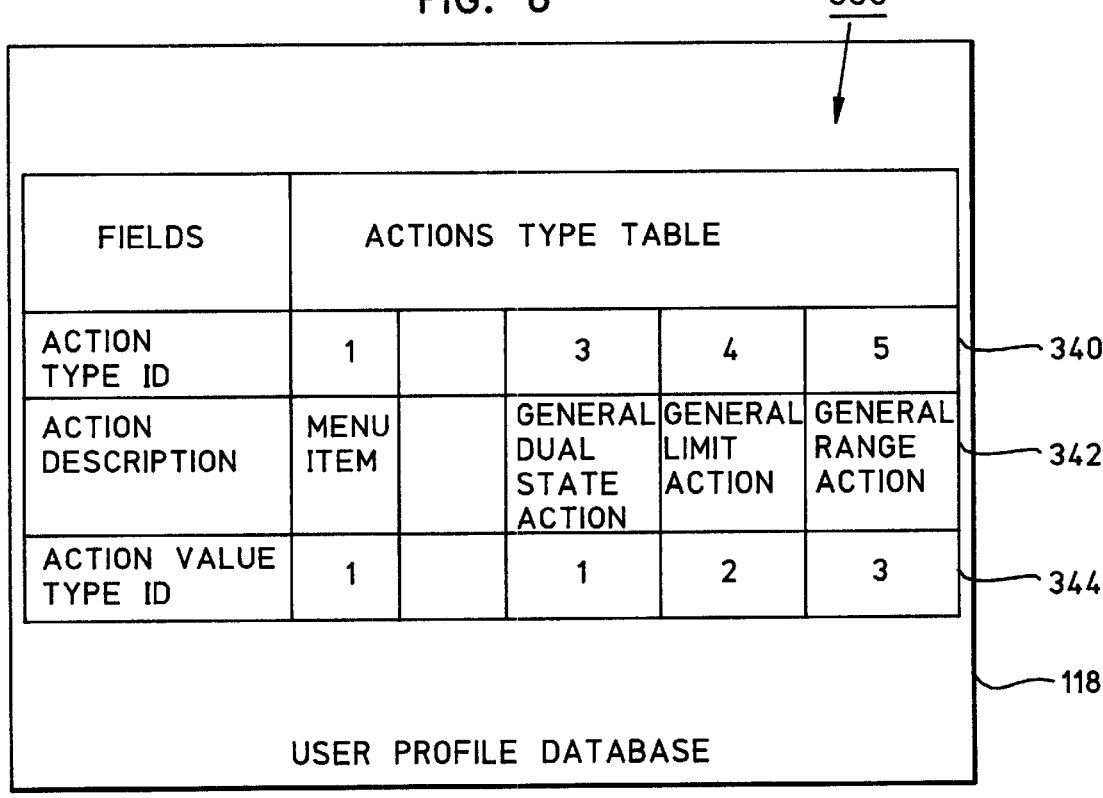
FIG. 7 is an action actions type table used by the software of FIG. 1.

As shown in FIG. 7, actions type table 338 is a read only table with a fixed number of entries. The actions type table 338 is used to support more user friendly action types. This table is one level higher than actions value type table 332. The idea behind introducing this table above the action value type table 332 is to categorize actions based on the purpose they serve rather than on the values they support. Entries of the action type table 338 are associated with entries in the actions value type table depending on the type of values they support.

Actions type table 338 has three fields: (1) Action Type ID 340, (2) Action Type Description 342, and (3) Action Value Type ID 344. Action Type ID 340 identifies an action type. Action Type Description 342 describes the action type in a user-friendly manner. Action Value Type Id 344 is an index to an entry in the action value type table 332.

In this example, five entries (action types) are supported as given below. As menu item supports two possible values (ENABLE/DISABLE) in the user profile system context, it can be viewed as an action type that supports two states (that is, a Dual State Action). So the Action Value Type ID field 340 is set to 1 for menu item.

If new action types are identified which have a general meaning for more than one module, then a further entry can be added to the actions type table 338. For example, an action type called "Max Instance" could be added as another action type if this action type is used in more than one module. On the other hand, if this type of action makes sense only in the context of one module (Object), then it can be described with the action type "Generic Limit Action" (Action Type ID=4). As described above, a module has to set the action type for each of the actions it is intended to include in user profile system 122. The value exported (through the .PRO file) as action type should correspond to one of the entries in this table.

Figures 8, 9:
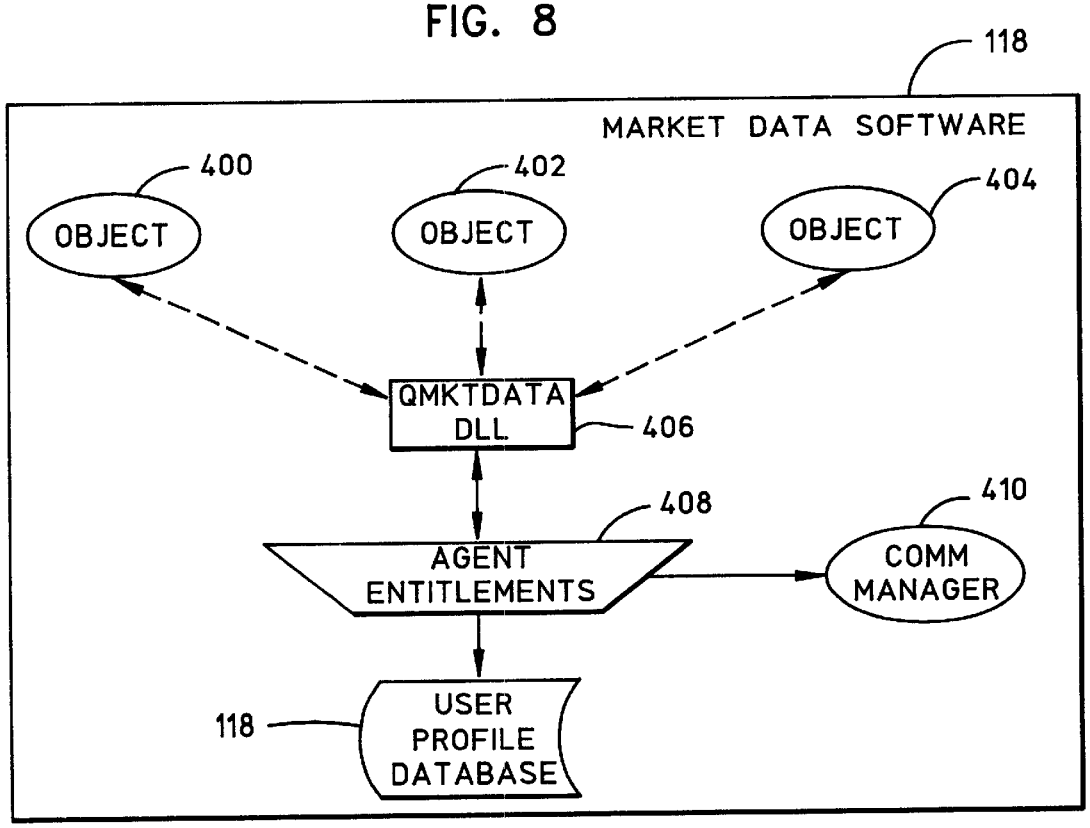
FIG. 8 is a main profile table used by the software of FIG. 1.
FIG. 9 is a block diagram of a portion of the software of FIG. 1.

As shown in FIG. 8, main profile table 346 is used to store action item values for a security level. Main profile table 346 maintains the list of action items that have been declared to be participating in the user profile system 122 by the subscriber. This is information used by the user profile system 122 when a user runs the market data software 118.

Main profile table 346 has five fields: (1) Level ID field 348, (2) Object ID field 350, (3) Action ID field 352, (4) Action Value field 354, and (5) Action Extra Value field 356. Each entry in main profile table 346 corresponds to an action item with values set under an object for the security level.

Level ID 348 corresponds to the security level to which the action items values are of interest. Object ID 350 identifies the module to which an action item belongs. Action ID 352 identifies the action item.

Action Value 354 is a first action item value set for an action item by the subscriber. The meaning of the value set to this field depends on the action item type of the action item. For Dual State Action Type action items, Action Value 354 will be a binary value (for example ENABLE or DISABLE). For Limit Action Type Action items, the Action Value 354 is ignored. For Range Action Type action items, the Action Value 354 is set to some minimum (or maximum) value used for controlling the action item parameter.

Action Extra Value 356 is additional information which may be required by an action item. The meaning of Action Extra Value 356 set to this field depends on the action item type of the action item. For Dual State Action type action items, the Action Extra Value 356 is not needed. For Limit Action Type Action items, the Action Extra Value 356 is value set as a limit of the action item. For Range Action Type action items, the Action Extra Value 356 is set to some maximum value used for controlling the action item parameter.

Although the embodiment discussed in detail herein includes two fields, Action Value 354 and Action Extra Value 356, for each action item, in many preferred embodiments of the present invention, only a single field is used to store the value of the action item. For example, an Action Item Value field could be set up to store Dual State Action Type action item values as binary numbers, to store Limit Action Type action item values as variants representing an upper or lower limit, and to store Range Action Type action item values as variants each representing both an upper and a lower limit.

Now generation of an action information file (.PRO file) will be described. Action information about an object might change during the course of enhancements to the objects. New action items might need to be added to user profile database 120 or some of the actions might become obsolete. In order to support such changes to user profile database 120 and to safeguard the overall system after the changes are made, the concept of generation of action information by each object is utilized.

All the objects participating in the user profile database 120 should define a set of actions that can be configured in the user profile system 122. The objects should maintain full information about the action internally. A simple structure can be used to maintain the action information. An example of code for this kind of simple structure follows:

typedef struct

```
{
int      nActionID;
char     csActionDesc[MAX_ACTION_DESC_LEN];
char     csPurposeDesc[MAX_ACTION_PUR-
         POSE_DESC_LEN];
int      nActionType;
long     nInternalRefId; // This used for internal reference in
         the context of the object.
} ProfileActionInfo;
```

As an example, entries appropriate to an application could be provided as shown in the following code:

```
ProfileActionInfo ProfileInfo[ ] =
{
{1,    "File New", "A menu item to create a new Nav Document",
       ACTION_MENUITEM, ID_FILE_NEW},
{2,    "File Open", "A menu item to open an existing Nav Document",
       ACTION_MENUITEM, ID_FILE_OPEN},
{3,    "File Print", "Provision to print a Nav document",
       ACTION_MENUITEM, ID_FILE_PRINT},
{4,    "File Exit", "Provision to exit Navigator through menu option",
       ACTION_MENUITEM, ID_APP_EXIT},
{5,    "Edit", "Enable or disable the entire editing functionality",
       ACTION_MENUITEM, ID_POPUP},
{6,    "Insert", "Provision to insert AAE services or any Ole Objects &
       to create add new navigator pages",
       ACTION_MENUITEM,    ID_POPUP},
{7,    "Move Item", "Ability to move any object in the navigator.
If it is set to FALSE, objects cannot be moved inside the Navigator.",
ACTION_DUALSTATE, ID_PROP_MOVE_ITEM},
{8,    "Resize Item", "Ability to resize the objects in the navigator.
If it is set to FALSE, objects cannot be resized inside the Navigator.",
ACTION_DUALSTATE, ID_PROP_RESIZE_ITEM},
{9,    "Objects per Page", "This sets a limit as to how many objects
can be inserted into a Navigator page", ACTION_LI-
MIT,    ID_PROP_OBJECTS_PER_PAGE},
{10,   "Max. Pages", "This sets a limit as what is the
maximum number of pages that can be added to a navigator document",
ACTION_LIMIT,    ID_PROP_MAX_PAGES},
{11,   "Max Objects", "This is the total number of objects
that are allowed to present in the navigator page".
ACTION_OBJECT_COUNT, ID_PROP_MAX_OBJECTS},
{12,   "Rename Pages", "Ability to rename a page item",
ACTION_MENUITEM, ID_RENAME_PAGE}
};
```

Using this information the objects generate a .PRO file which is a serialized file having following structure (which includes an array of CProfileInfo objects where each object holds the information about each object):

class CProInfoArray: public CobArray

```
{
    virtual void Serialize(CArchive& ar) { Serialize ObjecdID &
    Description & set of Action info objects;}
    CString m_csObjecID;
    CString m_csObjectDesc;
};
class CProfileInfo : public CObject
{
    int     m_nActiontID;
    CString m_csActionDesc;
    CString m_csPurposeDesc;
    int     m_nActionType;
void Serialize(CArchive& ar) { Serialize Action ID, Action Description &
Action type};
};
```

The generation of .PRO files for market data software OCX's can be done with a small application that calls a specific exported function in the OCX that generates the object file. OCX name can be passed as argument to this application. For generating the .PRO files for executables, like navigator, provision for a command line option should be supported. When the application is executed with a particular command line option it should generate the action information file.

The profile editor tool provides an interface for the subscriber to select a particular .PRO file and import the action information into user profile database 120. If an object corresponding to the .PRO file is already present in user profile database 120, then the subscriber is prompted with a message indicating that the previous action information will be replaced with the new action information and all the references to the old action information will be deleted. If subscriber agrees with that, then a new set of actions are defined under the selected object in the user profile database 120, replacing the old action information.

If object is new to the database, then new set of actions are defined under that object. In some embodiments according to the present invention, provision can be made to selectively import a single action item or to overwrite a single action item with a new one. The criteria used to check for an existing action item is the check for duplicate Action ID's (GUID). Each object in its internal profile information structure defines the Action ID's.

Now control flow in the run time components stage will be discussed with reference to FIG. 9. As shown in FIG. 9, market data software 118 includes user profile database 120, three objects 400, 402, 404, QMKTDATA DLL 406, entitlement agent 408 and comm manager 410.

When the objects 400, 402, 404 are created, they request entitlement agent 408 for user profile information. In doing so, the objects 400, 402, 404 have to provide the user's security level (that is the group of users, expert, medium or novice to which the user belongs). Objects 400, 402, 406 must further provide Object ID and set of action items, whose values are pertinent to the object. Once the profile information is received from entitlement agent 408, each object 400, 402, 404 will configure itself according to the user profile information received.

Entitlement agent 408 is the heart of the user profile system 122. When a request for user profile information is received from an object, entitlement agent 408 executes a sequence of steps before sending the user profile information back to the requesting object.

Figure 10:
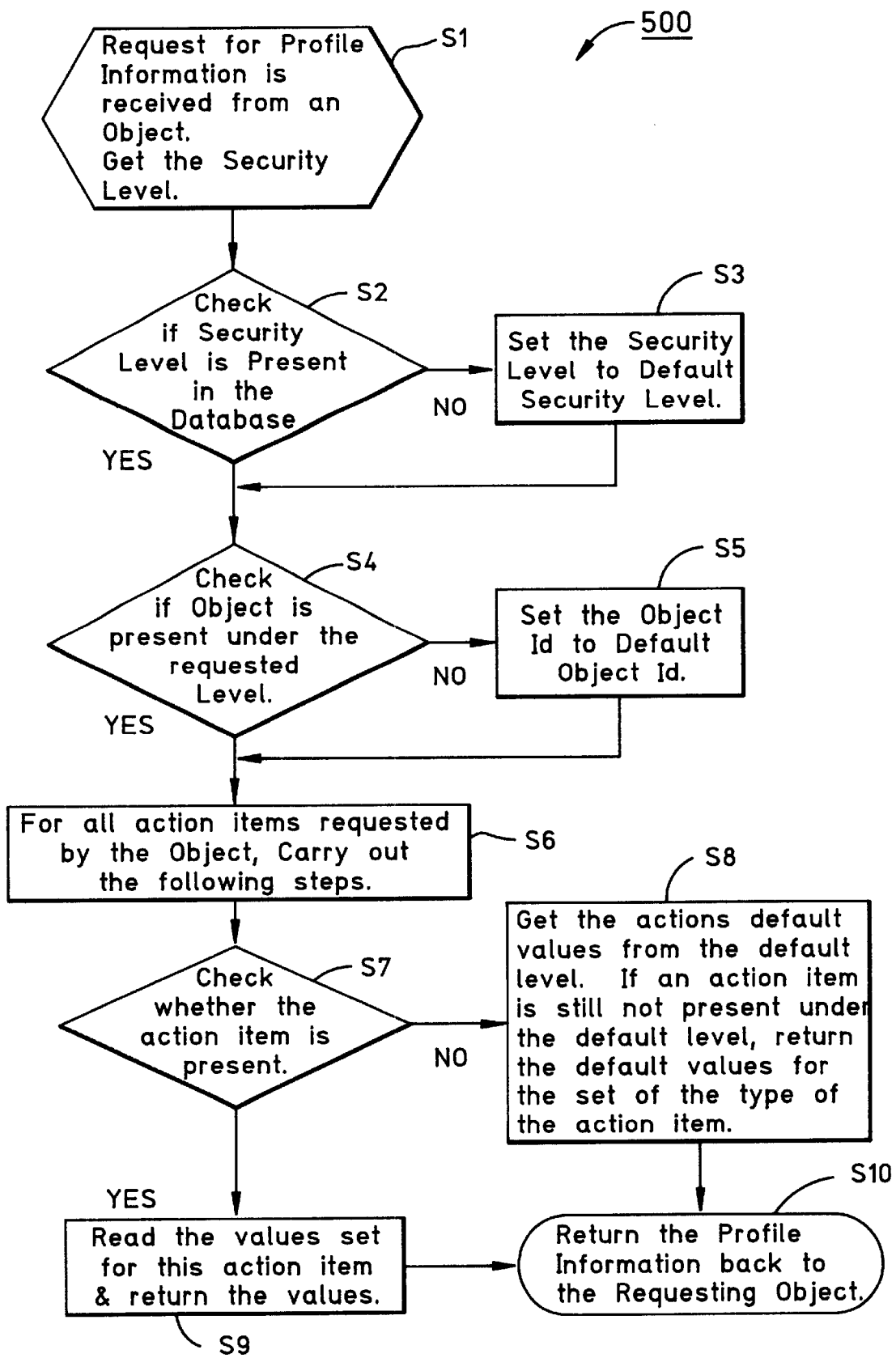
FIG. 10 is a flowchart representing operations of the software of FIG. 1.

These steps are explained below with reference to the flow chart of FIG. 10. At step S1, the request for user profile information and the security level are received. At step S2, entitlement agent 408 checks whether the specified security level is present in the user profile database 120. As explained above, user profile database 120 always contains information about a security level called "Default Level." The idea behind introducing a default level is to ensure that all objects gets some profile information upon their request to entitlement agent 408.

At step S3, entitlement agent 408 will look for user profile information under the default security level only if the security level assigned to the user is not available in the database.

At step S4 entitlement agent 408 determines whether the object is present under the requested level. Under each level at least one object called "Default Object" will always be present. When user profile information for a particular object is not available for the requested level, then at step S5 the default Profile information is returned as available under the "Default Object," and processing proceeds to step S6.

At step S7 it is determined whether an action item is present. Apart from default level and default objects, user profile database 120 also supports the concept of default action values. User profile database 120 maintains default values for each type of action under each object. When an object request for the user profile information for a set of action item, entitlement agent 408 looks for the requested action items at step S7.

If an action item is not declared to be participating in the user profile system for that object under a given security level, then at step S8 entitlement agent 408 checks the type of the action item and returns the default value set for that type under that object. On the other hand, if the action item is participating, then entitlement agent 408 reads the values set for this action item. At step S10, entitlement agent 408 returns the user profile information obtained at step S8 or step S9 to the requesting object.

In order to more fully illustrate the concept of an action item (defined above) some exemplary kinds of action items will now be discussed. However, these examples should not be used to limit the definition of the term "action item."

One category of action item relates to the extent to which the user can control the application display portion of display 116. For example, action items can be defined to specify whether individual users (or groups of users grouped under various security levels) can control display colors or fonts of displays generated by market data software 118. These action items might be, for example, Dual State Action Type action items determining whether or not users can adjust display colors or fonts.

Another category of action items relates to the process of data transfer when executing the market data software. For example, the priority value (explained above) of communications through network card 107 may be set for example as a Limit Action Type action item, where the limit represents the maximum priority which a user can assign to her data transfer communications.

As shown in FIG. 5, the network priority for the market data container (GUID1) is controlled as a Limit Action Type (2). As shown in FIG. 8, the subscriber has configured the Action Extra Value for this action item to 2 as the maximum limit. This means that the user can control the priority value, but cannot set the priority value to be any higher than 2. In this way, the subscriber can help ensure that only extremely important data transfers are executed at the highest priority level 3.

Another category of action items relates to the process of data output when executing market data software 118. For example, the extent to which users can control print format of hard copy of data output through printer 117 can be controlled by the subscriber through the use of one or more appropriate action items.

Another category of action items relates to the input devices, such as keyboard 114 and mouse 112. For example, the subscriber could configure appropriate action items to predefine the functions of various mouse 112 buttons or keyboard 114 keys.

Another category of action items relates to aspects of the user's interface with market data software 118. For example, the content of pull down menus can be customized for each user (or each security level) using action items.

Also, as shown in FIGS. 5 and 8, the number of financial modules which the user can insert in the broker application environment of market data software 118 can be controlled as a Range Action Type action item where the user can define between 4 and 25 modules. The greater the number of modules that a user inserts, the greater the demands on computer system resources and on communication bandwidth. Therefore, the number of modules allowed each user can be an important area for subscriber restrictions on the extent user control, because the subscriber can most accurately judge the relative needs of various users and can most fairly distribute limited system resources.

Certain preferred embodiments have been described above. It is likely that there are modifications and improvements to these embodiments which are within the literal scope or are equivalents of the claims which follow.

What is claimed is:

1. A method of using a software application comprising the following steps:

providing a copy of the application with at least one action item to a subscriber which has a plurality of associated users, the action item having at least one value being configurable by the subscriber and not being configurable by the users;

configuring the value of the action item for one of the users by the subscriber; and executing of the software application by the one of the users so that the functionality of the software will be controlled for the user in accordance with the value of the action item for that user, the step of executing comprising the steps of:

accessing an object by the one of the users;

sending a request to an entitlement agent for user profile information associated with the object for the one of the users;

accessing a user profile database;

transmitting to the object the user profile information associated with the object for the one of the users, the user profile information including the at least one value for the at least one action item, and when user profile information for the one of the users has not been associated with the object, transmitting default profile information to the object.

2. The method of claim 1 wherein the action item is control of an aspect of a display when executing the application.

3. The method according to claim 2 wherein the action item is control colors of the display.

4. The method according to claim 1 wherein the action item is control of an aspect of a process of data transfer when executing the application.

5. The method according to claim 4 wherein the action item is control of the rate of data transfer.

6. The method according to claim 1 wherein the action item is control of an aspect of data output from the application.

7. The method according to claim 6 wherein the action item is control of hard copy print format of substantive data output by the application.

8. The method according to claim 1 wherein the action item is control of an aspect of the user interface with the features of the application.

9. The method according to claim 8 wherein the action item is the content of pull-down command menus which the user can use to access or manipulate the substantive data.

10. The method according to claim 1 wherein the action item is a dual state type action.

11. The method according to claim 1 wherein the action item is a limit action type.

12. The method according to claim 1 wherein the action item is a range action type.

13. The method according to claim 1 wherein the action item is an extent of control action item which controls an extent of control which the user has with respect to an aspect of operation of the application, whereby the user maintains some control over the aspect, but is also restricted in her control of the aspect according the value of the action item configured by the subscriber.

14. The method of claim 1, the step of executing further comprises the step of configuring the object for use by the user according to the user profile information received.

15. The method of claim 1, wherein the step of sending a request to an entitlement agent comprises the steps of:
    transmitting a request from the object to the entitlement agent for user profile information; and
    sending to the entitlement agent a security level associated with the user, an Object ID for the object, and a set of action items including the at least one action item whose values are pertinent to the object.

16. The method of claim 15, wherein the step of accessing a user profile database comprises the steps of:
    checking the user profile database to determine whether a security level is present, and if the security level is not present, setting the security level to a default security level;
    determining whether the object is in the profile database under the security level, and if the object is not present under the security level, setting the Object ID to a Default Object ID;
    determining whether each of the action items sent by the object are present in the profile database for the Object ID and security level; and
    for each action item present for the Object ID and security level, reading the value set in the profile database;
    for each action item not present for the Object ID and security level, reading the default value set for a type associated with the action item and the Object ID.

17. The method of claim 15, wherein the step of transmitting the user profile information associated with the object for the user to the object comprises:
    returning the value set read for each action item present for the Object ID and the security level; and
    returning the default value set read for each action item not present for the Object ID and security level.

18. A physical medium having a computer software application coded thereon, the medium comprising:
    a substrate structured so that software can be coded thereon; and
    code coded onto the substrate, the code comprising:
        application code corresponding to computer instructions for executing the software application, with the application code defining at least one action item, the application code comprising:;
        a plurality of objects pertinent to the at least one action item;
        an entitlement agent receiving requests from the objects for user profile information and sending the user profile information requested back to a requesting object;
        a user profile database maintaining user profile information associated with a plurality of users and the objects, the user profile database being readable by the entitlement agent and being modifiable by a subscriber and not by the users; and
        configuration code corresponding to computer instructions for configuring the computer software application with action item values respectively for a plurality of users, the values being configurable by a subscriber and not being configurable by the users, whereby each user's access with respect to the action item is determined by the action item value.

19. The medium of claim 18 wherein the action item is control of an aspect of a display when executing the application.

20. The medium according to claim 18 wherein the action item is control of an aspect of a process of data transfer when executing the application.

21. The medium according to claim 18 wherein the action item is control of an aspect of data output from the application.

22. The medium according to claim 18 wherein the action item is control of an aspect of the user interface with the features of the application.

23. The physical medium of claim 18, wherein the at least one action item has an action item type selected from the group consisting of a dual state type action, a limit action type, and a range action type.

24. The physical medium of claim 18, wherein the user profile database comprises:
    a levels set table maintaining a plurality of currently available security levels;
    an objects set table maintaining a list of the objects;
    a level-objects table maintaining a list of the objects organized under each of the currently available security levels;
    an object actions table maintaining a list of action items;
    an actions value typeset table identifying an action value type id for each action item; and
    a main profile table correlating each of the action items with a values set under related ones of the objects for each applicable one of a plurality of security levels.

25. The physical medium of claim 24, further comprising an actions type table categorizing each one of the action items according to a purpose they serve.

26. The physical medium of claim 25, wherein the actions type table comprises:

an action id type field;

an action type description field; and an action value type id.

27. The physical medium of claim 24, wherein the levels set table comprises:

a level id field; and a level description field.

28. The physical medium of claim 24, wherein the objects set table comprises:

an object id field; and an object description field.

29. The physical medium of claim 24, wherein the level-objects table comprises:

a level id field; and an object id field.

30. The physical medium of claim 24, wherein the object actions table comprises:

an object id field;

an action id field;

an action description field;

an action purpose description field; and an action type id field.

31. The physical medium of claim 24, wherein the actions value typeset table comprises:

an action value type id field; and an action value type description.

32. The physical medium of claim 24, wherein the a main profile table comprises:

a level id field;

an object id field;

an action id field;

an action value field; and an action extra value field.

33. The physical medium of claim 18, further comprising a dynamic link library interfacing between the objects and the entitlement agent.

34. The physical medium of claim 18, further comprising a communications manager in communication with the entitlement agent.

* * * * *